United States Patent
Chuang

(10) Patent No.: US 6,985,197 B2
(45) Date of Patent: Jan. 10, 2006

(54) TRANSFLECTIVE LIQUID CRYSTAL DISPLAY

(75) Inventor: Li-Sen Chuang, Penghu (TW)

(73) Assignee: Toppoly Optoelectronics Corp., Miao-Li (TW)

( * ) Notice: Subject to any disclaimer, the term of this patent is extended or adjusted under 35 U.S.C. 154(b) by 65 days.

(21) Appl. No.: 10/250,288

(22) Filed: Jun. 20, 2003

(65) Prior Publication Data

US 2004/0090576 A1   May 13, 2004

(30) Foreign Application Priority Data

Nov. 7, 2002 (TW) .......................... 91132742 A

(51) Int. Cl.
*G02F 1/1335* (2006.01)

(52) U.S. Cl. ....................................... 349/114
(58) Field of Classification Search ................. 349/114
See application file for complete search history.

(56) References Cited

U.S. PATENT DOCUMENTS 6,697,138 B2 *   2/2004   Ha et al. .................... 349/114

* cited by examiner

*Primary Examiner*—Tarifur R. Chowdhury
*Assistant Examiner*—Richard H Kim
(74) *Attorney, Agent, or Firm*—Jianq Chyun IP Office

(57) ABSTRACT

A transflective liquid crystal display comprising an active device array substrate, a facing substrate, a liquid crystal layer and a reflector. The liquid crystal molecules in the transparent area are driven by a potential between the transparent pixel electrode and the common electrode. The liquid crystal molecules in the reflective area are driven by a potential between the transparent pixel electrode and the active device array substrate or the auxiliary electrode on the facing substrate. Under the condition of a single cell gap, the electric field applied to the transparent area and the reflective area can control the change in effective phase so as to optimize the performance.

16 Claims, 6 Drawing Sheets

TRANSFLECTIVE LIQUID CRYSTAL DISPLAY

CROSS REFERENCE TO RELATED APPLICATIONS

This application claims the priority benefit of Taiwan application serial no. 91132742, filed Nov. 07, 2002.

BACKGROUND OF INVENTION

1. Field of Invention

The present invention relates to a transflective liquid crystal display (LCD). More particularly, the present invention relates to a single cell gap transflective liquid crystal display.

2. Description of Related Art

Due to progress in the development of semiconductor devices or man-machine display interface, multimedia communication is almost a routine in everyday life. High-quality and economical displaying devices such as cathode ray tube (CRT) are in the market for some time. However, as a desktop terminal/display, CRT is rather bulky and occupies a lot of space, and from the standpoint of energy conservation, CRT consumes too much electrical energy. Hence, CRT can no longer meet our demands for a light, compact and energy efficient display. Since the recently developed thin film transistor liquid crystal display (TFT-LCD) has superior image quality, slim, low power consumption and radiation free characteristics, TFT-LCD is now a major sell in the market.

Most liquid crystal displays (LCD) can be categorized into the transparent type, the reflective type and the transflective type. The classification is based on the different light source utilization and array arrangements. The transparent LCD uses back light as a source of illumination and the pixel electrodes on the array are transparent to facilitate the penetration of back light. The reflective LCD uses front light or external light as a source of illumination and the pixel electrons on the array are made from metal or other substances having good reflective properties so that the front or external light can be reflected. The transflective LCD uses both back light and external light as a source of illumination at the same time. Each pixel can be divided into a transparent area and a reflective area. The transparent area has a transparent electrode that facilitates the passage of back light and the reflective area has a reflective electrode capable of reflecting light from external light sources.

Using a normally black transflective LCD as an example, both the transparent area and the reflective area are in a dark state before the application of a voltage. When the transparent area and the reflective area change from a dark state to the brightest state, phase in the transparent area must differ by $\lambda/2$ and phase in the reflective area must differ by $\lambda/4$. However, in a single cell gap LCD, the required phase differences are hard to secure at the same time. Thus, optimal utilization of light in both the transparent area and the reflective area is difficult to attain in practice. Due to intrinsic display limitations of a single cell gap transflective LCD, transflective LCD having dual cell gaps are developed. By designing the transparent area and the reflective area with different cell gaps, light from whatever sources is fully utilized.

FIG. 1A is a schematic cross-sectional view of a conventional dual cell gap transflective liquid crystal display. As shown in FIG. 1A, the dual cell cap transflective LCD 100 mainly comprises of a thin film transistor (TFT) array substrate 102, a facing substrate 104 and a liquid crystal layer 106. The cell gap in the transmission region (T) of the transflective LCD is controlled to a distance d while the cell gap in the reflective area (R) of the transflective LCD is controlled to a distance d/2. Hence, the liquid crystal layer 106 within the transparent area (T) has a thickness d and the liquid crystal layer 106 within the reflective area (R) has a thickness d/2. In addition, the cell gap or the thickness d of the liquid crystal layer 106 must also meet the phase change relationship $(\Delta n \cdot d) = \lambda/2$. Therefore, through a thickness variation (d to d/2) of the liquid crystal layer 106, there is a phase change of $\lambda/2$ and $\lambda/4$ inside the respective cell gaps.

FIG. 1B is a schematic layout diagram of a conventional dual cell gap transflective LCD. As shown in FIG. 1B, the active device array substrate 102 has a plurality of scanning lines 200 and a plurality of data lines 202 thereon. Each pair of neighboring scanning lines 200 and each pair of neighboring data lines 202 constitute a pixel region 212. Each pixel region 212 has an active device 204, a transparent electrode 206 and a reflective electrode 208. The transparent electrode 206 is positioned over a portion of the pixel region 212 to form a transparent area (T). The reflective electrode 208 is positioned over a portion of the pixel region 212 outside the transparent area (T) to form a reflective area (R).

In general, the transparent electrode 206 and the reflective electrode 208 in the same pixel region 212 are electrically connected together. Hence, the transparent electrode 206 and the reflective electrode 208 within the same pixel region 212 are controlled by one active device 204. Furthermore, the active device 204 is, for example, a thin film transistor (TFT) or a diode that may switch state when driven voltages applied to the scanning line 200 and the data line 202.

Although the dual cell gap transflective LCD is able to optimize illumination, the substrate plates are difficult to fabricate.

SUMMARY OF INVENTION

Accordingly, one object of the present invention is to provide a transflective liquid crystal display (LCD) having a single cell cap structure that uses an applied electric field to control phase changes within the reflective area and the transparent area of the LCD. Hence, the reflective area and the transparent area in the transflective LCD are optimally illuminated.

To achieve these and other advantages and in accordance with the purpose of the invention, as embodied and broadly described herein, the invention provides a transflective liquid crystal display. The transflective LCD mainly comprises of a thin film transistor (TFT) array, a facing substrate and a liquid crystal layer. The active device array substrate has a plurality of scanning lines and a plurality of data lines thereon. Each pair of neighboring scanning lines and each pair of neighboring data lines together constitute a pixel region. Each pixel region has an active device, a transparent electrode and a reflector. The active device is driven by voltage applied to the scan line and the data line. The transparent electrode is positioned in a portion of the pixel region to form a transparent area and the reflector is positioned in the pixel region but outside the transparent area to form a reflective area. The transparent electrode and the active device are electrically connected. The facing substrate has a plurality of common electrodes and a plurality of auxiliary electrodes. The common electrode is positioned above the transparent electrode and the auxiliary electrode is positioned above the reflector. The liquid crystal layer is positioned between the active device array substrate and the facing substrate. The transparent area and the reflective area have an identical thickness. Furthermore, a first alignment film is positioned between the liquid crystal layer and the active device array substrate and a second alignment film is positioned between liquid crystal layer and the facing substrate. In addition, a top polarizing plate is positioned just outside the active device array substrate and a bottom polarizing plate is positioned just outside the facing substrate.

This invention also provides a second type of transflective liquid crystal display that comprises of an active device array substrate, a facing substrate, a liquid crystal layer and a reflector. The active device array substrate has a plurality of scan lines and a plurality of data lines thereon. Each pair of neighboring scan lines and each pair of neighboring data lines constitutes a pixel region. Each pixel region has an active device and a transparent electrode. The active device is driven by voltage applied to the scan line and the data line. The transparent electrode is positioned over the pixel region to form a transparent area. The transparent electrode and the active device are electrically connected together. The facing substrate has a plurality of common electrodes and a plurality of auxiliary electrodes thereon. The common electrode is positioned over the transparent electrode and the auxiliary electrode is positioned outside the transparent area. The reflector is positioned outside the active device array substrate to form a reflective area. The liquid crystal layer is positioned between the active device array substrate and the facing substrate. The transparent area and the reflective area have an identical thickness. Furthermore, a first alignment film is positioned between the liquid crystal layer and the active device array substrate and a second alignment film is positioned between liquid crystal layer and the facing substrate. In addition, a top polarizing plate is positioned just outside the active device array substrate and a bottom polarizing plate is positioned just outside the facing substrate.

This invention also provides a third type of transflective liquid crystal display comprising of an active device array substrate, a facing substrate and a liquid crystal layer. The active device array substrate has a plurality of scanning lines and a plurality of data lines thereon. Each pair of neighboring scan lines and each pair of neighboring data lines together constitutes a pixel region. Each pixel region has an active device, a reflective electrode and an auxiliary electrode. The active device is driven by voltage applied to the scanning line and the data line. The reflective electrode is positioned over a portion of the pixel region to form a reflective area. The pixel region outside the reflective area is a transparent area. The reflective electrode and the active device are electrically connected together. The facing substrate has a plurality of common electrodes thereon. The common electrodes are positioned over the reflective electrodes. The liquid crystal layer is positioned between the active device array substrate and the facing substrate. The transparent area and the reflective area have an identical thickness. Furthermore, a first alignment film is positioned between the liquid crystal layer and the active device array substrate and a second alignment film is positioned between liquid crystal layer and the facing substrate. In addition, a top polarizing plate is positioned just outside the active device array substrate and a bottom polarizing plate is positioned just outside the facing substrate.

In this invention, the active device array substrate is a thin film transistor (TFT) array substrate or a diode array substrate, for example. In addition, the LCD may also serve as a color display by adding a color filter on the facing substrate in a position that corresponds to the pixel region to form a color filtering plate.

This invention also permits the installation of a first delay plate between the top polarizing plate and the active device array substrate and a second delay plate between the bottom polarizing plate and the active device array substrate.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 1A:
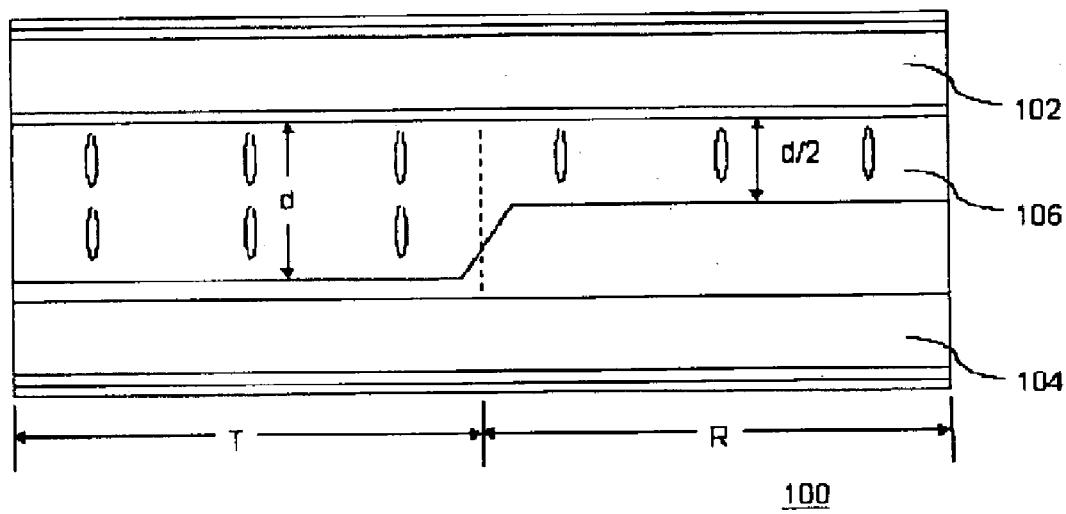
FIG. 1A is a schematic cross-sectional view of a conventional dual cell gap transflective liquid crystal display.
Figure 1B:
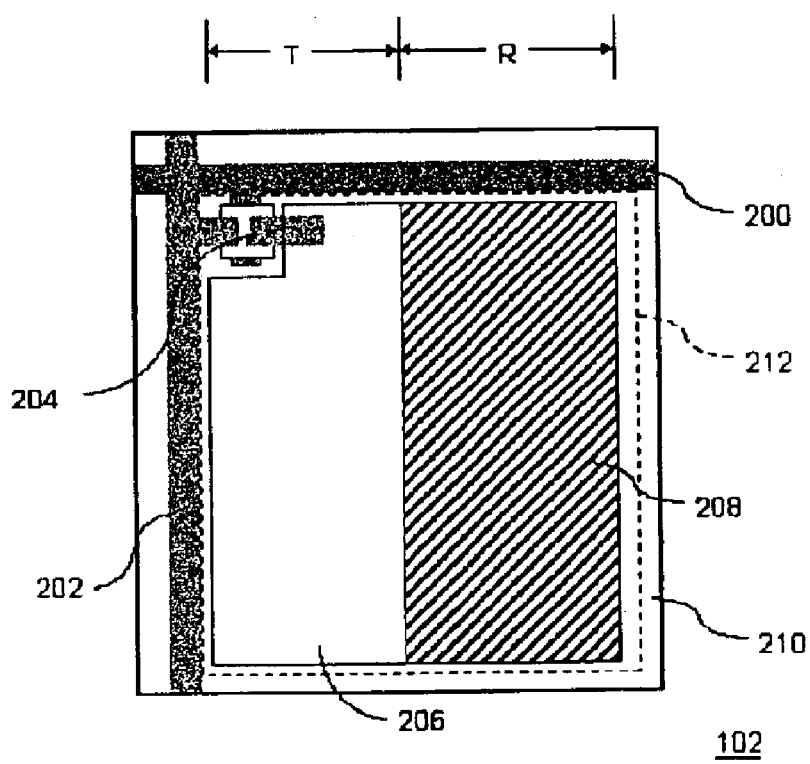
FIG. 1B is a schematic layout diagram of a conventional dual cell gap transflective LCD.

Reference will now be made in detail to the present preferred embodiments of the invention, examples of which are illustrated in the accompanying drawings. Wherever possible, the same reference numbers are used in the drawings and the description to refer to the same or like parts.

Figure 2A:
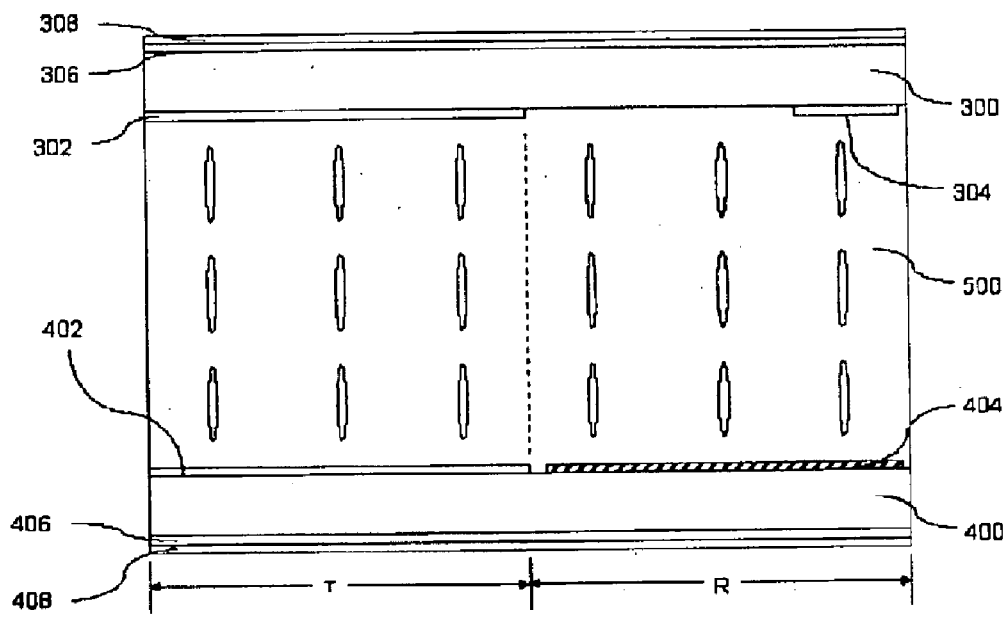
FIGS. 2A and 2B are schematic cross-sectional views of a transflective liquid crystal display according to a first embodiment of this invention.
Figure 2B:
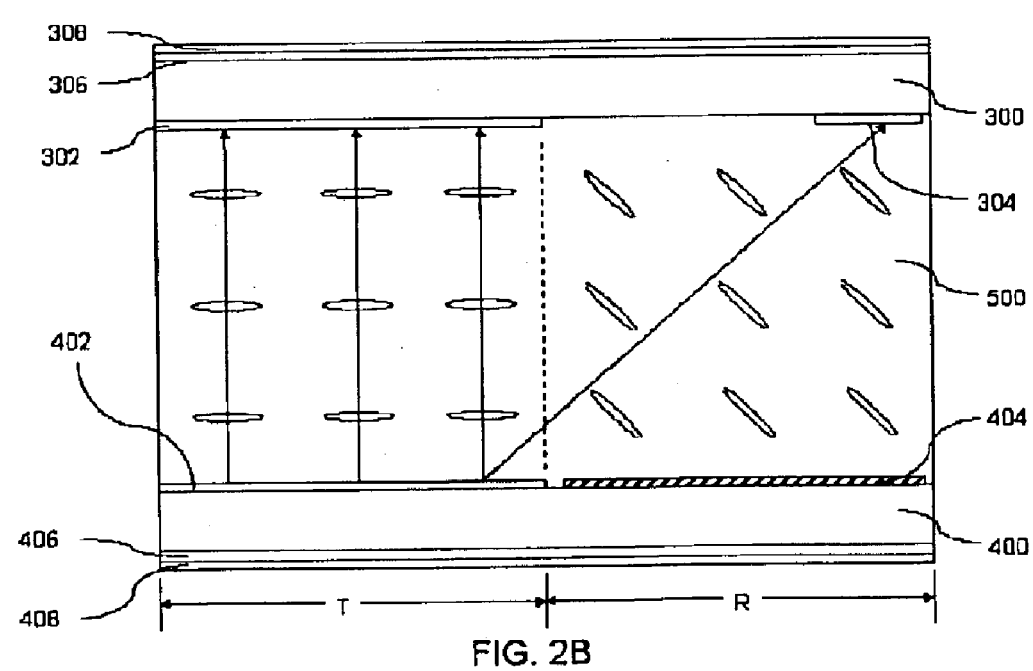

FIGS. 2A and 2B are schematic cross-sectional views of a transflective liquid crystal display according to a first embodiment of this invention. As shown in FIG. 2A, the transflective liquid crystal display (LCD) mainly comprises of an active device array substrate 400, a complementary panel 300 and a liquid crystal layer 500. The Active device array substrate 400 has a plurality of pixel regions thereon. Each pixel region has an active device (not shown), a transparent electrode 402 and a reflector 404. The active device (not shown) and the transparent electrode 402 are positioned over a portion of the pixel region to form a transparent area (T). The reflector 404 and the pixel region 212 outside the transparent area (T) form a reflective area (R). Note that the transparent electrode 402 and the reflector 404 have no electrical connection.

The facing substrate 300 has a plurality of common electrode 302 and a plurality of auxiliary electrodes 304 thereon. The common electrode 302 is positioned over the transparent electrode 402 and the auxiliary electrode 304 is positioned over the reflector 404. In addition, the liquid crystal layer 500 is positioned between the active device array substrate 400 and the facing substrate 300.

Aside from the active device array substrate 400, the facing substrate 300 and the liquid crystal layer 500, optical films such as a first delay plate 306 and a top polarizing plate 308 may be attached to the outer surface of the facing substrate 300. In addition, optical films such as a second delay plate 406 and a bottom polarizing plate 408 are attached to the outer surface of the active device array substrate 400. The first delay plate 306 is capable of delaying incoming light by λ/2 phase. Similarly, the second delay plate 406 is capable of delaying incoming light by λ/4 phase.

The liquid crystal layer 500 used in this embodiment is, for example, negative liquid crystals so that slow axis of the liquid crystal molecules is parallel to the electric field provided. Without the application of a voltage, the liquid crystal molecules are aligned in a manner as shown in FIG. 2A. Hence, overall effective phase difference of the liquid crystal layer 500 is zero and both the transparent area (T) and the reflective area (R) are in a dark state. The transparent area (T) and the reflective area (R) change from a dark state to the brightest state when an electric field perpendicular to the surface of the active device array substrate 400 is created between the transparent electrode 402 and the common electrode 302 in the liquid crystal layer 500 within the transparent area (T). The vertical electric field aligns the liquid crystal molecules in a direction shown on the left side of FIG. 2B such that the transparent area (T) has an effective phase difference of λ/2.

Since the transparent electrode 402 and the reflector 404 have no electrical connection, the electric field in the reflective area (R) is created through the transparent electrode 402 and the auxiliary electrode 304. In this embodiment, through the potential difference between the transparent electrode 402 and the auxiliary electrode 304, an electric field forming an oblique angle with the surface of the active device array substrate 400 is created in the liquid crystal layer 500 within the reflective area (R). This oblique electric field aligns liquid crystal molecules in a direction as shown on the right side of FIG. 2B such that the reflective area (R) has an effective phase difference of λ/4.

Accordingly, phase variation in the transparent area (T) is (λ/2−0)=λ/2 and thus the phase variation meets the demanded phase variation Â±λ/2. Similarly, phase variation in the reflective area (R) is (λ/4−0)=λ/4 and hence the phase variation meets the demanded phase variation Â±λ/4. Ultimately, optimal utilization of light in both the transparent area and the reflective area is achieved.

Figure 3:
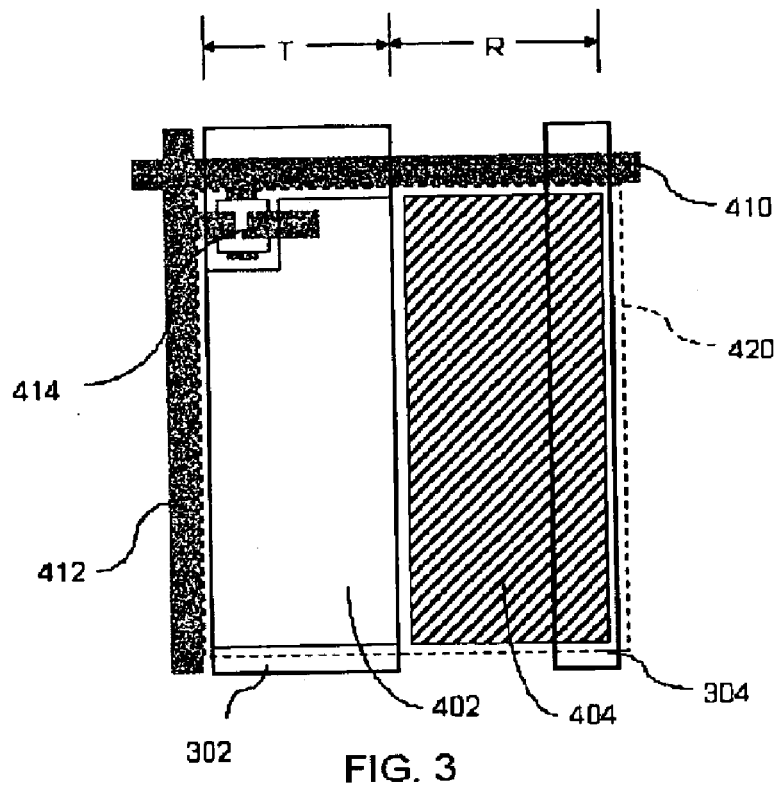
FIG. 3 is a diagram showing the layout of a transflective LCD according the first embodiment of this invention.

FIG. 3 is a diagram showing the layout of a transflective LCD according the first embodiment of this invention. As shown in FIG. 3, the active device array substrate has a plurality of scanning lines 410 and a plurality of data lines 412 thereon. Neighboring scanning lines 410 and neighboring data lines 412 together form a pixel region 420. Each pixel region 420 has an active device 414, a transparent electrode 402 and a reflector 404. The active device 414 such as a thin film transistor or a diode is able to change state when driven by applied voltage at the scanning line 410 and the data line 412. The transparent electrode 402 is positioned over a portion of the pixel region 212 to form a transparent area (T) and the reflector 404 is also positioned over a portion of the pixel region 212 to form a reflective area (R).

The transparent electrode 402 has no electrical connection with the reflector 404. Hence, the liquid crystal molecules above the reflector 404 (the reflective area (R)) are driven by the oblique electric field between the transparent electrode 402 and the auxiliary electrode 304. The liquid crystal molecules above the transparent electrode 402 (the transparent area (T)) are driven by the vertical electric field between the transparent electrode 402 and the common electrode 302.

Figure 4A:
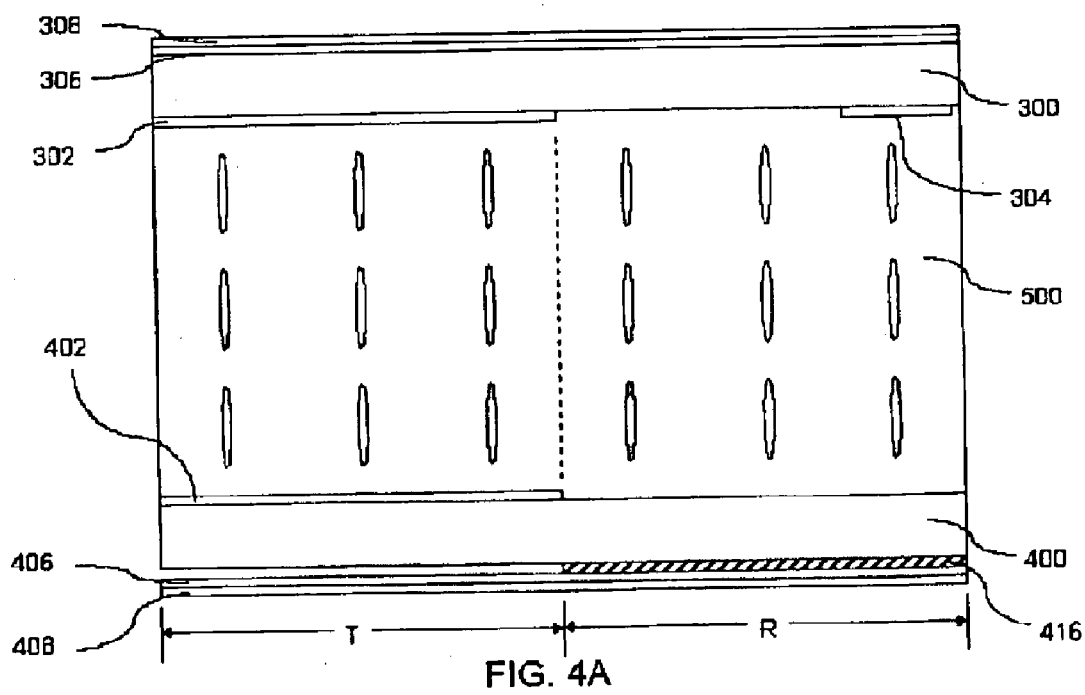
FIGS. 4A and 4B are schematic cross-sectional views of a transflective liquid crystal display according to a second embodiment of this invention.
Figure 4B:
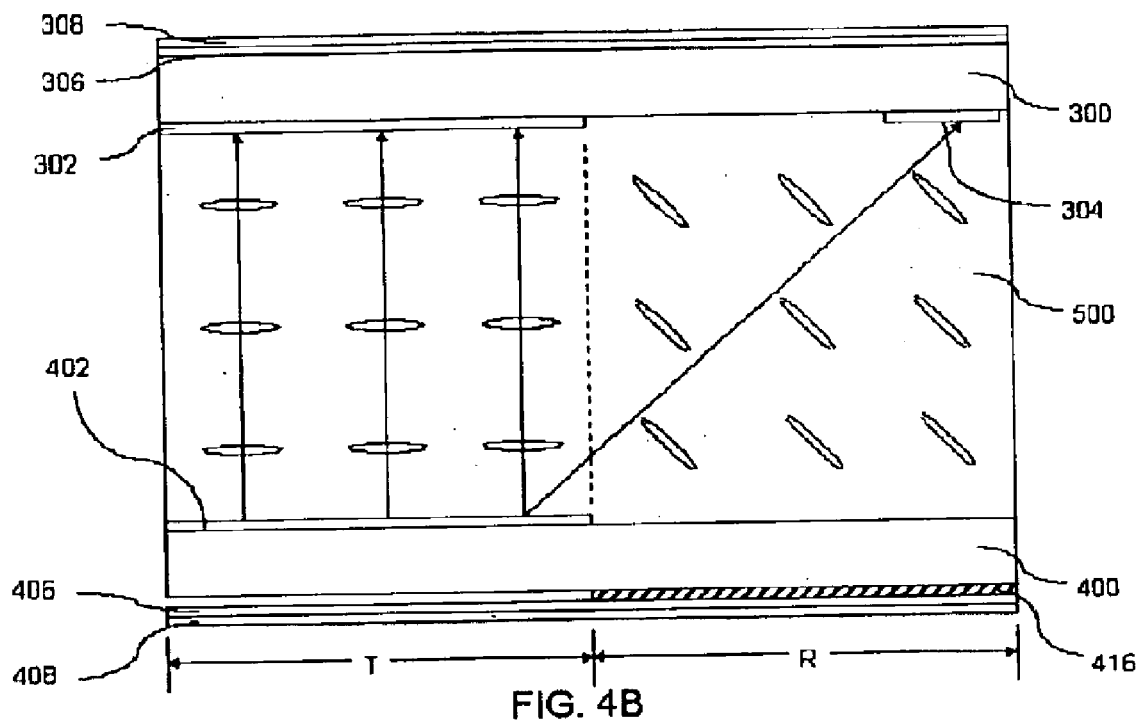

FIGS. 4A and 4B are schematic cross-sectional views of a transflective liquid crystal display according to a second embodiment of this invention. In general, the reflector 404 in the first embodiment can be attached to the active device array substrate 400 in other ways. In the second embodiment, a reflector 416 is attached to the outer surface of the active device array substrate 400. The reflector 416 is similarly capable of reflecting light from light sources (including front light and external light).

Figure 5:
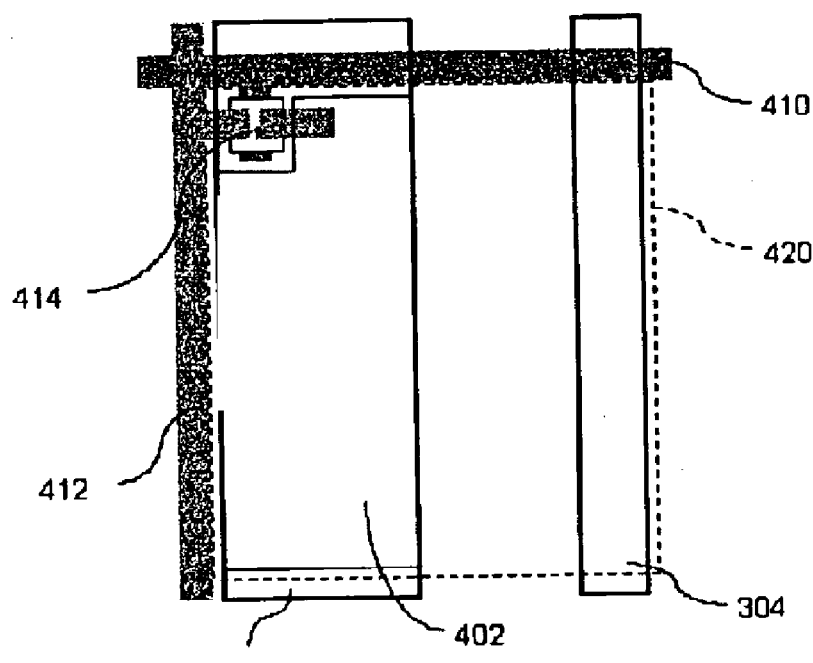
FIG. 5 is a diagram showing the layout of a transflective LCD according the second embodiment of this invention.

FIG. 5 is a diagram showing the layout of a transflective LCD according the second embodiment of this invention. As shown in FIG. 5, the active device array substrate has a plurality of scanning lines 410 and a plurality of data lines 412 thereon. Neighboring scanning lines 410 and neighboring data lines 412 together form a pixel region 420. Each pixel region 420 has an active device 414 and a transparent electrode 402. The active device 414 such as a thin film transistor or a diode is able to change state when driven by applied voltage at the scanning line 410 and the data line 412. The transparent electrode 402 is positioned over a portion of the pixel region 212 to form a transparent area (T) and the potion of the pixel region 212 outside the transparent area (T) is regarded as a reflective area (R).

In the second embodiment, the liquid crystal molecules above the reflective area (R) is driven by the oblique electric field between the transparent electrode 402 and the auxiliary electrode 304. Similarly, the liquid crystal molecules above the transparent area (T) are driven by the vertical electric field between the transparent electrode 402 and the common electrode 302.

Figure 6A:
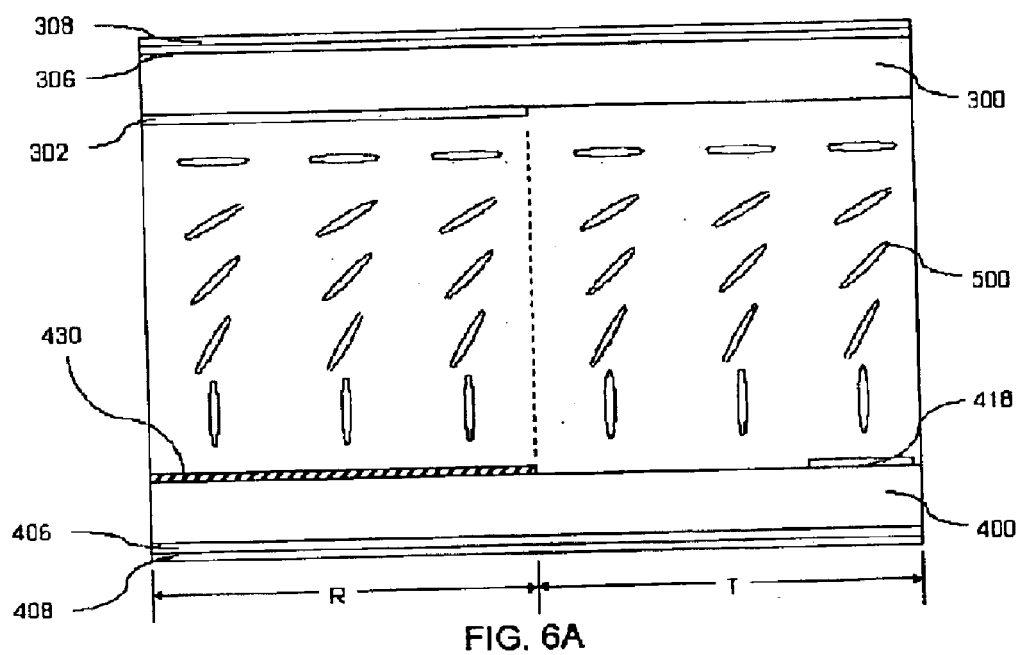
FIGS. 6A and 6B are schematic cross-sectional views of a transflective liquid crystal display according to a third embodiment of this invention.
Figure 6B:
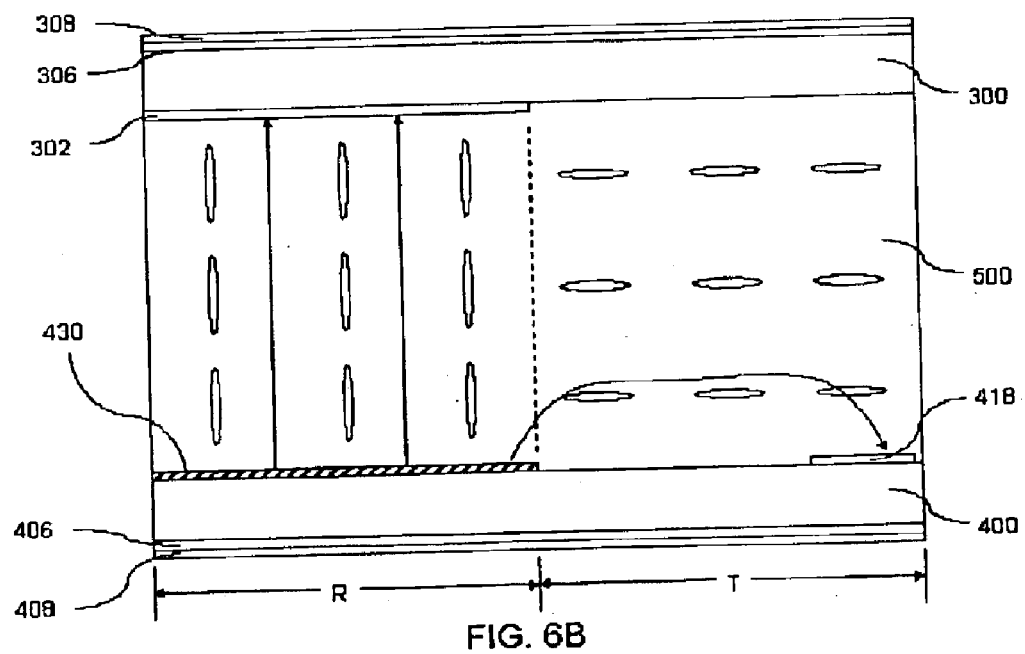

FIGS. 6A and 6B are schematic cross-sectional views of a transflective liquid crystal display according to a third embodiment of this invention. As shown in FIGS. 6A and 6B, the transflective LCD mainly comprises of an active device array substrate 400, a facing substrate 300 and a liquid crystal layer 500. The active device array substrate 400 has a plurality of pixel regions thereon. Each pixel region has an active device (not shown), a reflective electrode 430 and an auxiliary electrode 418. The active device (not shown) and the reflective electrode 430 are positioned over a portion of the pixel region to form a reflective area (R). The pixel region 212 outside the reflective area (R) is regarded as a transparent area (T). The facing substrate 300 has a plurality of common electrodes 302 thereon. The common electrodes 302 are positioned above the reflective electrode 430. In addition, the liquid crystal layer 500 is positioned between the active device array substrate 400 and the facing substrate 300.

The third embodiment is similar to the first embodiment of this invention in many ways. In the first embodiment, the auxiliary electrode 304 is positioned over the facing substrate 300 and the liquid crystal molecules above the reflective area (R) are driven by the oblique electric field between the auxiliary electrode 304 and the transparent electrode 402. In the third embodiment, however, the auxiliary electrode 418 is positioned above the transparent area (T) of the active device array substrate 400. Hence, the liquid crystal molecules above the transparent area (T) are driven by the lateral electric field between the reflective electrode 430 and the auxiliary electrode 418. In addition, optical films such as a first delay plate 306 and a top polarizing plate 308 may be attached to the outer surface of the facing substrate 300. Similarly, optical films such as a second delay plate 406 and a bottom polarizing plate 408 are attached to the outer surface of the active device array substrate 400. The first delay plate 306 is capable of delaying incoming light by $\lambda/2$ phase and the second delay plate 406 is capable of delaying incoming light by $\lambda/4$ phase.

The liquid crystal layer 500 in the third embodiment uses, for example, positive crystals that have a hybrid alignment or oblique alignment so that the fast axis of the liquid crystal molecules is parallel to the electric field provided. The liquid crystal molecules are aligned in a direction as shown in FIG. 6A before the application of any voltage. Thus, the liquid crystal layer 500 produces an overall phase difference of $\lambda/4$ and both the transparent area (T) and the reflective area (R) are in a dark state. To change the transparent area (T) and the reflective area (R) to a brightest state, the transparent electrode 430 and the common electrode 302 provide an electric field perpendicular to the surface of the active device array substrate 400 in the liquid crystal layer 500 within the reflective area (R). The vertical electric field aligns the liquid crystal molecules in a direction as shown on the left side of FIG. 6B such that the effective phase difference in the transparent area (T) is zero.

In the third embodiment, the reflective electrode 430 and the auxiliary electrode 418 provides a lateral electric field parallel to the surface of the active device array substrate 400 in the liquid crystal layer 500 of the transparent area (T). The lateral electric field aligns the liquid crystal molecules in a direction as shown on the right side of FIG. 6B so that the transparent area (T) has an effective phase difference of $3\lambda/4$.

Accordingly, phase variation in the transparent area (T) is $(3\lambda/4 - \lambda/4) = -\lambda/2$ and thus the phase variation meets the demanded phase variation $\pm\lambda/2$. Similarly, phase variation in the reflective area (R) is $(0 - \lambda/4) = -\lambda/4$ and hence the phase variation meets the demanded phase variation $\pm\lambda/4$. Ultimately, optimal utilization of light in both the transparent area and the reflective area is achieved.

Figure 7:
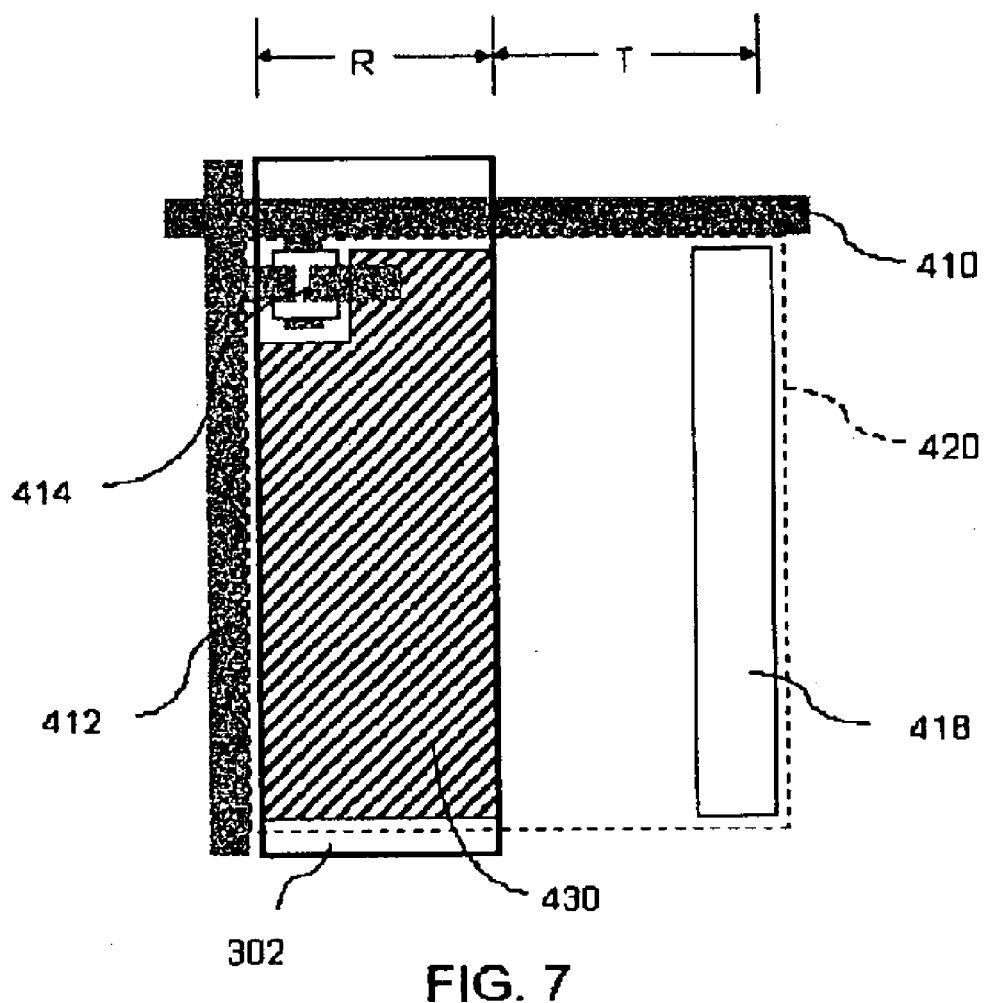
FIG. 7 is a diagram showing the layout of a transflective LCD according the third embodiment of this invention.

FIG. 7 is a diagram showing the layout of a transflective LCD according the third embodiment of this invention. As shown in FIG. 7, the liquid crystal molecules above the reflective area (R) are driven by the vertical electric field between the reflective electrode 430 and the common electrode 302. Similarly, the liquid crystal molecules above the transparent area (T) are driven by the lateral electric field between the reflective electrode 430 and the auxiliary electrode 418.

In the aforementioned embodiments, the positioning of the transparent electrode, the reflective electrode, the common electrode and the auxiliary electrode relative to each other is utilized to provide an electric field having an appropriate direction and strength. Thus, the effective phase difference of liquid crystal molecules above the transparent area (T) and the reflective area (R) may vary in such a way that light utilization in the transmission region (T) and the reflective area (R) are optimized.

In summary, the transflective liquid crystal display has at least the following advantages: 1. The effective phase difference in the reflective area and the transparent area is controlled by the direction of an applied electric field so that light utilization in the reflective area and the transparent area is optimized. 2. In the third embodiment, there is no need to fabricate the transparent electrode. Nevertheless, the liquid crystal molecules above the transparent area (T) and the reflective area (R) are simultaneously driven. Hence, fabrication process is simplified. 3. Since the transparent electrode pattern on the active device array substrate and the common electrode pattern on the facing substrate need to be modified, production is compatible with existing processes.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A transflective liquid crystal display (LCD), comprising:
   an active device array substrate having a plurality of pixel regions, wherein each pixel region has an active device disposed on a first side of the active array substrate;
   a transparent electrode positioned over a portion of the pixel region to form a transparent area and a reflector positioned on another portion of the pixel region to form a reflective area;
   a facing substrate positioned above the active device array substrate having a plurality of common electrodes, wherein the common electrode positioned above the transparent electrode;
   a plurality of auxiliary electrodes formed on the reflective area of the facing substrate; and
   a liquid crystal layer positioned between the active device array substrate and the facing substrate.

2. The transflective LCD of claim 1, wherein the active device array substrate is either a thin film transistor array substrate or a diode array substrate.

3. The transflective LCD of claim 1, wherein the facing substrate further includes a plurality of color filter films positioned in areas corresponding to the pixel regions.

4. The transflective LCD of claim 1, wherein the LCD further includes a first polarizing plate just outside the active device array substrate and a second polarizing plate just outside the facing substrate.

5. The transflective LCD of claim 4, wherein the LCD further includes a first delay plate positioned between the first polarizing plate and the active device array substrate and a second delay plate between the second polarizing plate and the active device array substrate.

6. A transflective liquid crystal display (LCD), comprising:
   an active device array substrate having a plurality of scanning lines and a plurality of data lines thereon such that each pair of neighboring scan lines and each pair of neighboring data lines together form a pixel region, wherein each pixel region has an active device and a transparent electrode, the active device is driven by a voltage applied to the scan line and the data line, the transparent electrode is positioned over the pixel region to form a transparent area, and the transparent electrode and the active device are electrically connected;
   a facing substrate having a plurality of common electrodes and a plurality of auxiliary electrodes thereon, wherein the common electrode is positioned above the transparent electrode and the auxiliary electrode is positioned above the pixel area outside the transparent electrode;
   a reflector positioned outside the active device array substrate to form a reflective area; and a liquid crystal layer positioned between the active device array substrate and the facing substrate wherein the transparent area and the reflective area have an identical thickness, furthermore, a first alignment film is positioned between the liquid crystal layer and the active device array substrate and a second alignment film is positioned between the liquid crystal layer and the facing substrate.

7. The transflective LCD of claim 6, wherein the active device array substrate is either a thin film transistor array substrate or a diode array substrate.

8. The transflective LCD of claim 6, wherein the facing substrate further includes a plurality of color filter films positioned in areas corresponding to the pixel regions.

9. The transflective LCD of claim 6, wherein the LCD further includes:
   a top polarizing plate positioned just outside the active device array substrate; and
   a bottom polarizing plate positioned just outside the facing substrate.

10. The transflective LCD of claim 9, wherein the LCD further includes:
    a first delay plate between the top polarizing plate and the active device array substrate; and
    a second delay plate between the bottom polarizing plate and the active device array substrate.

11. The transflective LCD of claim 1, wherein a thickness of the liquid crystal layer in the transparent area is same as a thickness of the liquid crystal layer in the reflective area.

12. The transflective LCD of claim 1, wherein a first alignment film positioned between the liquid crystal layer and the active device array substrate and a second alignment film is positioned between the liquid crystal layer and the facing substrate.

13. The transflective LCD of claim 1, wherein the reflector positioned on the first side of the active device array substrate or on an side of opposite the first side of the active device array substrate.

14. The transflective LCD of claim 1, wherein a plurality of liquid crystal molecules of the liquid crystal layer above the reflective area are driven by an oblique electric field between the auxiliary electrode and the transparent electrode.

15. The transflective LCD of claim 14, wherein the oblique electric field aligns the liquid crystal molecules in a direction of the reflective area is equivalent to phase difference of $\lambda/4$.

16. The transflective LCD of claim 14, wherein the liquid crystal molecules above the transparent area are driven by a vertical electric field between the common electrode and the transparent electrode.

* * * * *